US008489848B2

(12) United States Patent
Bauman et al.

(10) Patent No.: US 8,489,848 B2
(45) Date of Patent: *Jul. 16, 2013

(54) DATA COMMUNICATIONS BETWEEN THE COMPUTER MEMORY OF THE LOGICAL PARTITIONS AND THE DATA STORAGE DEVICES THROUGH A HOST FIBRE CHANNEL ADAPTER

(75) Inventors: Ellen M. Bauman, Rochester, MN (US); Timothy J. Schimke, Stewartville, MN (US); Lee A. Sendelbach, Rochester, MN (US); Joseph T. Writz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,868

(22) Filed: Apr. 20, 2012

(65) Prior Publication Data
US 2012/0210086 A1 Aug. 16, 2012

Related U.S. Application Data

(63) Continuation of application No. 12/251,722, filed on Oct. 15, 2008, now Pat. No. 8,250,281.

(51) Int. Cl.
*G06F 12/00* (2006.01)
(52) U.S. Cl.
USPC ............... 711/173; 711/6; 711/104; 711/153; 709/215
(58) Field of Classification Search
USPC ...................... 711/6, 104, 153, 173; 709/215
See application file for complete search history.

(56) References Cited

U.S. PATENT DOCUMENTS

| 7,954,099 B2 | 5/2011 | Easton et al. |
| 2002/0129230 A1 | 9/2002 | Albright et al. |
| 2003/0046505 A1 | 3/2003 | Craddock et al. |
| 2006/0195618 A1 | 8/2006 | Arndt et al. |
| 2006/0195642 A1 | 8/2006 | Arndt et al. |
| 2006/0195663 A1 | 8/2006 | Arndt et al. |
| 2006/0212620 A1 | 9/2006 | Arndt et al. |
| 2008/0028408 A1 | 1/2008 | Day et al. |
| 2008/0225859 A1 | 9/2008 | Mitchem et al. |
| 2009/0059955 A1 | 3/2009 | Georgiou et al. |
| 2010/0095080 A1 | 4/2010 | Bauman et al. |

OTHER PUBLICATIONS

Shanley, "Protected Mode Software Architecture", PC System Architecture Series, Mar. 1996, pp. 245-247, MindShare Inc., USA.
Office Action, U.S. Appl. No. 12/251,722, Aug. 19, 2011.
Notice of Allowance, U.S. Appl. No. 12/251,722, Apr. 13, 2012.

*Primary Examiner* — Reginald Bragdon
*Assistant Examiner* — Gurtej Bansal
(74) *Attorney, Agent, or Firm* — Biggers & Chanian LLP

(57) ABSTRACT

Data communications through a host Fibre Channel adapter ('HFCA') implemented with a computer that includes two or more logical partitions, each logical partition including a separate instance of an operating system, each instance of an operating system including an instance of a low-level, switched fabric input/output ('I/O') library, including establishing, in the HFCA by instances of the I/O library in two or more logical partitions and by the hypervisor, separate logical Fibre Channel adapters ('LFCAs') for at least two of the logical partitions, each LFCA including an association of an LFCA identifier with at least one range of I/O memory addresses in the address space of a logical partition and transferring, at the behest of application programs in the two or more logical partitions, data between the RAM of the logical partitions and the data storage devices through the LFCAs, the HFCA, and the Fibre Channel fabric.

18 Claims, 5 Drawing Sheets

DATA COMMUNICATIONS BETWEEN THE COMPUTER MEMORY OF THE LOGICAL PARTITIONS AND THE DATA STORAGE DEVICES THROUGH A HOST FIBRE CHANNEL ADAPTER

CROSS-REFERENCE TO RELATED APPLICATION

This application is a continuation application of and claims priority from U.S. patent application Ser. No. 12/251,722, filed on Oct. 15, 2008.

BACKGROUND OF THE INVENTION

1. Field of the Invention

The field of the invention is data processing, or, more specifically, methods, apparatus, and products for data communications through a host Fibre Channel adapter ('HFCA').

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Powerful computer systems today are increasingly partitioned into a number of logical partitions. Each of these logical partitions typically accesses I/O resources, including disk storage. Such disk storage today is commonly accessed via a Fibre Channel storage area network. The drawback to this solution is that each logical partition is required to have its own, separate, physical Fibre Channel adapter to connect to a Fiber Channel network. For a large system, such a solution requires a large number of physical adapters, which drives significant additional expense. The additional expense includes not only the adapters themselves but also the physical enclosures that provide associated PCI or PCIe adapter slots, as well as the additional power requirements of many additional physical adapters.

SUMMARY OF THE INVENTION

Methods, apparatus, and computer program products are disclosed for data communications through a host Fibre Channel adapter ('HFCA') implemented on a computer, the computer including random access memory ('RAM') operatively coupled to at least one computer processor, the computer coupled for data communications through the HFCA and a Fibre Channel switch of a Fibre Channel fabric to one or more data storage devices, the computer including two or more logical partitions, the logical partitions administered by a hypervisor, each logical partition assigned a portion of the RAM of the computer, each logical partition executing an application program, each logical partition including a separate instance of an operating system, each instance of an operating system including an instance of a low-level, switched fabric input/output ('I/O') library, including establishing, in the HFCA by instances of the I/O library in two or more logical partitions and by the hypervisor, separate logical Fibre Channel adapters ('LFCAs') for at least two of the logical partitions, each LFCA including an association of an LFCA identifier with at least one range of I/O memory addresses in the address space of a logical partition and transferring, at the behest of application programs in the two or more logical partitions, data between the RAM of the logical partitions and the data storage devices through the LFCAs, the HFCA, and the Fibre Channel fabric.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
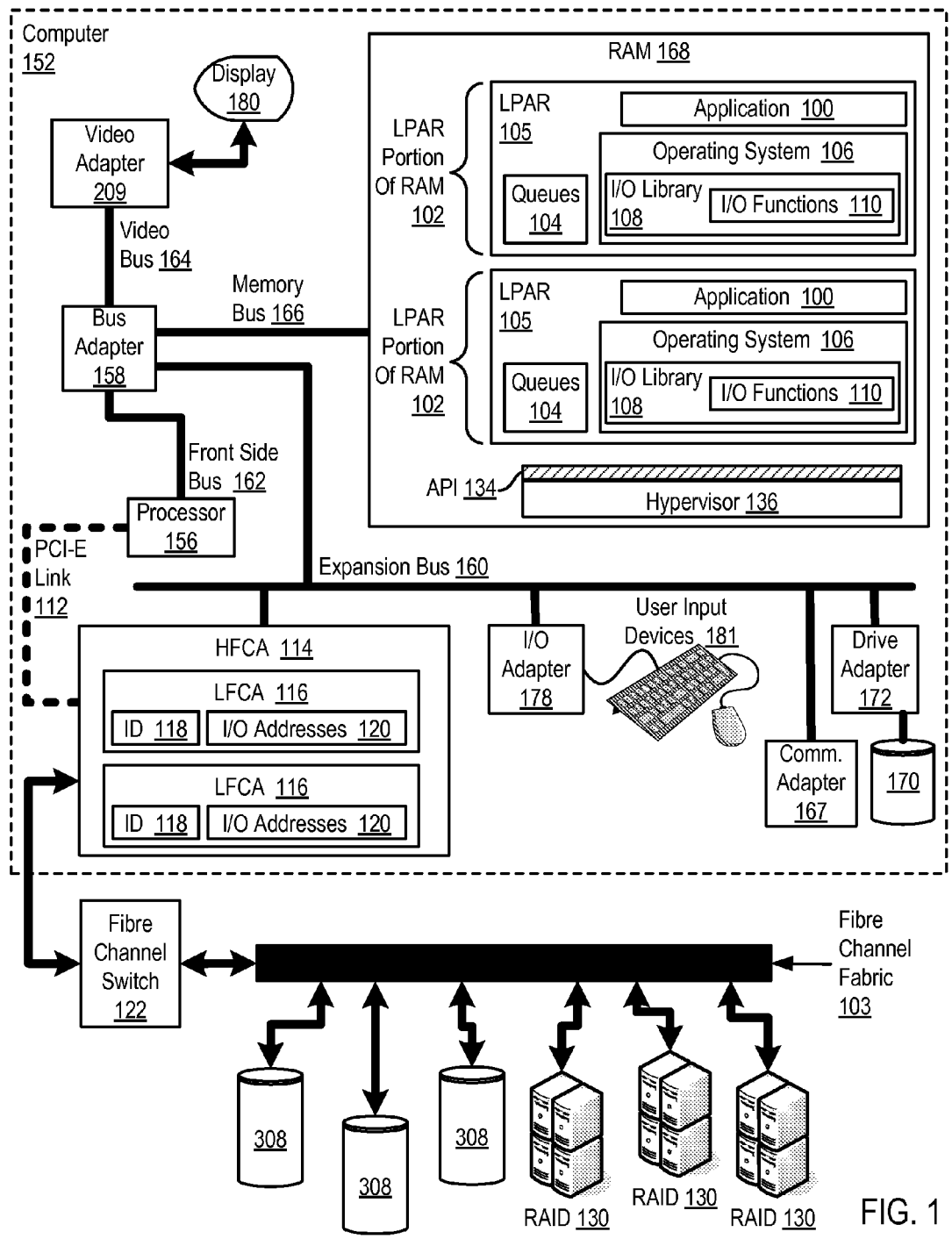
FIG. 1 sets forth a diagram of a distributed data processing system for data communications through an HFCA according to embodiments of the present invention.

Exemplary methods, apparatus, and products for data communications through a host Fibre Channel adapter ('HFCA') in accordance with embodiments of the present invention are described with reference to the accompanying drawings, beginning with FIG. 1. FIG. 1 sets forth a diagram of a distributed data processing system for data communications through an HFCA according to embodiments of the present invention. The system of FIG. 1 includes a computer (152) that is coupled for data communications through an HFCA (114), a Fibre Channel switch (122), and a Fibre Channel fabric (103) to multiple data storage device (308, 130). Fibre Channel is an American National Standards Institute ('ANSI') standard defining a data communications architecture and protocol suite that are often used for data communications within Storage Area Networks or SANs. Fibre Channel was designed for use with mass storage devices and other peripheral devices that require very high bandwidth. Fibre Channel supports high data transfer rates, not only through optical fiber networks but also over wireline networks as well.

The Fibre Channel switch (122) is a data communications network switch compatible with the Fibre Channel architecture and protocol suite. The Fibre Channel switch in this example couples the example computer (152) to the Fibre Channel fabric (103) through the HFCA (114). The Fibre Channel fabric (103) is a data communications network composed of Fibre Channel switches and other Fibre Channel-compatible devices which supports many-to-many communication, device name lookup, security, and redundancy, all in accordance with the Fibre Channel architecture and protocols. In the example of FIG. 1, the Fibre Channel fabric (103) provides many-to-many communications to and from several individual data storage devices (308) as well as several a redundant arrays of independent disks ('RAID arrays') (130). A RAID array is storage device that employs two or more disk drives in combination for improved fault tolerance and improved performance.

As an aid to explanation, FIG. 1 also includes a functional block diagram of the example computer (152). The example computer (152) includes at least one computer processor (156) or 'CPU' as well as random access memory (168) ('RAM') which is connected through a high speed memory bus (166) and bus adapter (158) to processor (156) and to other components of the computer (152). The example computer also includes the HFCA (114) which is connected to the processor (156) through expansion bus (160). The expansion bus (160) may be implemented as a Peripheral Component Interconnect or 'PCI' bus, in which all the connected peripheral devices share the same bidirectional, parallel signal path. FIG. 1 also illustrates an alternative mode of connection between the HFCA and the processor through a Peripheral Component Interconnect Express or 'PCIe' link (112). Such a PCIe link is built around pairs of serial, unidirectional point-to-point connections known as 'lanes,' each connecting only a single peripheral device, faster than a PCI bus.

In the example of FIG. 1, the computer (152) includes an HFCA (114). The HFCA (114) of FIG. 1 is a physical adapter, a module of computer hardware and software, that implements Fibre Channel communications between computer (152) and multiple storage devices (308, 130) through a Fibre Channel fabric (103), with Fibre Channel port names implemented with World Wide Names or 'WWNs,' node ports or 'N-Ports' implemented with Fibre Channel network addresses, and so on, all in accordance with the Fibre Channel standards. In addition, the HFCA (114) is improved to implement data communications according to embodiments of the present invention by supporting multiple logical Fibre Channel adapters for multiple logical partitions of computer (152).

Disposed in RAM are two logical partitions ('LPARs') (105), each of which is disposed in a portion of RAM (102) assigned to one LPAR. Each LPAR is a set of data structures and services administered by a hypervisor each of which enables applications programs and an operating system to run concurrently with other applications and operating systems on the same computer hardware. LPARs allow the distribution of computer resources within a single computer to make the computer function as if it were two or more independent computers. From the perspective of an application or any instance of an operating system, an LPAR appears as an entire computer.

In this example, each LPAR includes an application program (100), a separate instance of an operating system (106), and I/O queues (104). The I/O queues (104) are RAM storage locations in which are stored I/O instructions and I/O data, data transferred to and from storage devices. Each I/O queue (104) is defined as a portion of the RAM memory address space of an LPAR, a range of I/O memory addresses. The applications programs (100) are modules of computer program instructions that carry out user-level data processing, using the operating system to effect input/output ('I/O') to and from the storage devices (308, 130). Examples of application programs include data processors, spreadsheets, database managers, browsers, email clients, and the like. An operating system is a computer software component that is responsible for execution of applications programs and for administration of access to computer resources, memory, processor time, and I/O functions, on behalf of application programs. Operating systems, instances of which are useful in LPARs in computers that implement data communications with HFCAs according to embodiments of the present invention, include UNIX™, Linux™, Microsoft Vista™, IBM's AIX™, IBM's i5/OS™, and others as will occur to those of skill in the art.

Each instance of an operating system in this example includes an instance of a low-level, switched fabric I/O library (108). A switched fabric is a network topology in which network nodes connect with each other through one or more network switches. The term 'switched fabric' is often used in the field of telecommunications to described such networks and is also used in describing Fibre Channel storage area networks and other high-speed networks, including InfiniBand networks. Each instance of a switched fabric I/O library (108) in this example is a module of computer program instructions composed of I/O functions (110) that perform low-level I/O operations between an LPAR (105) and a remote storage device (308). Low-level I/O operations are I/O operations at the level of logical unit numbers ('LUNs') and logical block addresses ('LBAs'). By way of contrast, the applications (100) view disk I/O as reads and writes to and from disk files, knowing nothing of LUNs or LBAs. Each operating system (106), through a file system, maps files to LUNs and LBAs, and the I/O library (108) exposes the LUNs to the operating system (106) and to the applications (100) as disk drives.

Also disposed in RAM is a hypervisor (136), a module of computer program instructions that administers LPARs. The hypervisor (136) is a layer of system software that organizes computer resources through LPARs so that multiple operating systems run on a computer at the same time, each operating in a separate LPAR. The hypervisor (136) creates, assigns resources to, and deletes LPARs, for example, at startup in accordance with configuration information, at run time as instructed by a system administrator, or at run time at the behest of load balancing components of a computer. The hypervisor (136) implements multiple LPARs on a single computer by assigning to each LPAR (105) one or more 'virtual processors,' each of which represents a portion of the processor time of one or more physical computer processors or processor cores. From the perspective of an operating system (106) or application (100) in an LPAR (105) executing on a virtual processor, such an application or operating system is operating on a physical processor or processor core.

The HFCA (114) in the example of FIG. 1 includes two or more logical Fibre Channel adapters ('LFCAs') (116), a separate LFCA for each of the two or more LPARs (105). The host Fibre Channel adapter or 'HFCA' (114) in this example is a 'host' Fibre Channel adapter in the sense that it is a Fibre Channel adapter improved according to embodiments of the present invention to be capable of hosting multiple LFCAs. Each LFCA (116) is composed of an association of an LFCA identifier (118) with at least one range of I/O memory addresses (120) in the address space of an LPAR. The I/O memory addresses (120) identify RAM space of an LPAR to and from which the HFCA transfers data at user privilege level on behalf of an application program (100) running in an LPAR (105), including transmitting the data by the HFCA (114) directly to or from the RAM (102) of the LPAR, buffering no additional copy of the transferred data in the HFCA (114).

The LFCAs (116) are 'logical' in the sense of 'virtual.' That is, an LFCA is not an HFCA, nor is it a Fibre Channel adapter of any kind Instead, an LFCA is a set of structures and procedures that enable an HFCA to operate as though it were multiple physical adapters with a separate physical Fibre Channel adapter dedicated to the use of any LPAR. An LFCA presents to an LPAR the appearance and function of a separate whole Fibre Channel adapter, so that multiple LPARs appear to operate multiple Fibre Channel adapters, despite the fact only one HFCA is installed in the computer. An LPAR uses an LFCA in the same manner as the LPAR would use a dedicated, physical Fibre Channel adapter. The LFCA is exposed to the LPAR through exactly the same interface or API as would be a dedicated, separate Fibre Channel adapter, so that the LPAR cannot distinguish between a dedicated, physical Fibre Channel adapter and an LFCA. In this example, the LPARs and the LFCAs are said to be 'two or more,' although in the example of FIG. 1, they both are exactly two. The number of two LPARS and the two LFCAs in this example, however, is presented only for ease of explanation, not for limitation of the invention. A computer that implements data communication through an HFCA according to embodiments of the present invention, with LPARs and LFCAs, can use any number of LPARs and LFCAs as may occur to those of skill in the art.

In the example computer of FIG. 1, the I/O libraries (108) in the LPARs (105) and the hypervisor (136) work together to establish LFCAs (116). The I/O libraries (108) and the hypervisor (136), working together, establish in the HFCA (114) separate LFCAs (116) for at least two of the logical partitions, where, as mentioned above, each LFCA is composed of an association of an LFCA identifier (118) with at least one range of I/O memory addresses (120) in the address space of a logical partition. In this example, the range of I/O memory addresses specifies I/O queues (104) in each LPAR. Each LPAR contains an instance of an I/O library that in turn includes I/O functions (110) that call LFCA support functions in the hypervisor through API (134) to establish an LFCA. The API calls are identical to the API calls that an I/O library would make to initialize a driver for an actual Fibre Channel adapter, so that the fact that the calls establish an LFCA is actually transparent to the LPARs and their I/O libraries. The I/O memory addresses (120) in each LFCA (116) effectively map each LFCA to a separate one of the LPARs (105). When applications programs in the LPARs eventually request I/O to or from a remote data storage device, computer (152) transfers data between the RAM (102) of the logical partitions and the data storage devices through the LFCAs (116), the HFCA (114), and the Fibre Channel fabric (103). In this example, such transfers of data to and from a storage device are carried out at user privilege level on behalf of an application program running in an LPAR, including transmitting the data by the HFCA directly to or from the RAM of a logical partition, buffering no additional copy of the transferred data in the HFCA. The transmissions of data directly to and from LPAR RAM (102) at the specified I/O memory addresses (120) and the maintenance of the user privilege level means that the computer does not incur the costly processing overhead of an I/O interrupt for context switching to a more protected privilege level in carrying out such transfers.

The computer (152) of FIG. 1 includes disk drive adapter (172) coupled through expansion bus (160) and bus adapter (158) to processor (156) and other components of the computer (152). Disk drive adapter (172) can connect non-volatile data storage to the computer (152) in the form of internal disk drive (170), for example. Disk drive adapters useful in computers for data communications through an HFCA (114) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers and for data communications with a data communications network. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and 802.11 adapters for wireless data communications network communications.

The arrangement of devices making up the example data processing system illustrated in FIG. 1 is for explanation, not for limitation. Data processing systems that implement data communications through an HFCA according to various embodiments of the present invention may include additional servers, routers, switches, adapters, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1. The example computer (152) may be implemented in a variety of forms as will occur to those of skill in the art, including, for example, a personal computer, a laptop computer, a blade server in a large data center, or a compute node in a supercomputer.

Figure 2:
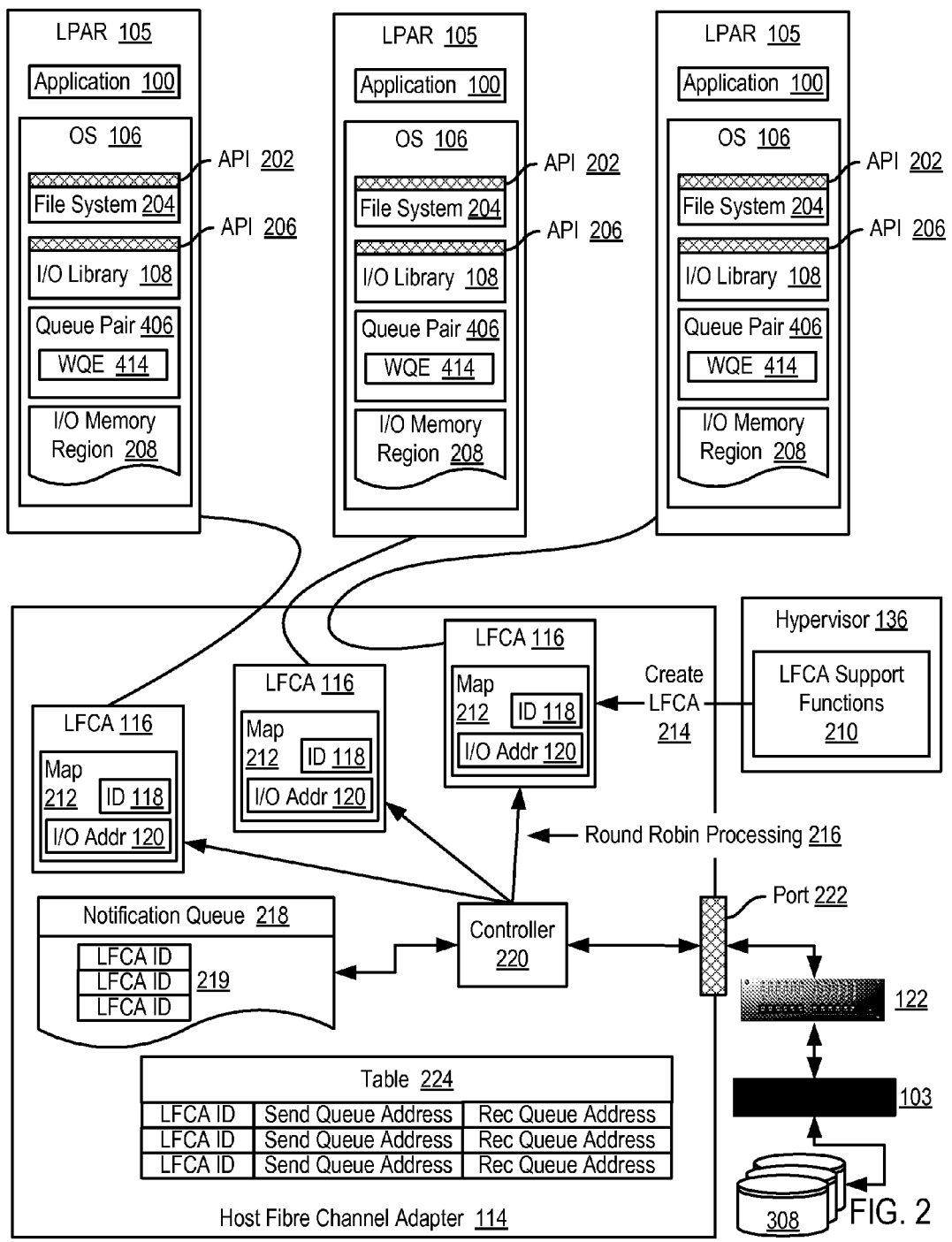
FIG. 2 sets forth a functional block diagram of an example data processing system that implements data communications through an HFCA according to embodiments of the present invention FIG. 3 sets forth a flow chart illustrating an exemplary method of data communications through an HFCA according to embodiments of the present invention.

For further explanation, FIG. 2 sets forth a functional block diagram of an example data processing system that implements data communications through an HFCA according to embodiments of the present invention. The example data processing system of FIG. 2 includes three LPARs (105), a hypervisor (136), and an HFCA (114), all of which operate in or on a computer similar to the one described above with reference to FIG. 1, a computer having one or more computer processors operatively coupled to RAM in which the LPARs are disposed. The data processing system of FIG. 2 includes couplings for data communications through an HFCA (114), a Fibre Channel switch (122), and a Fibre Channel fabric (103) to multiple data storage device (308). Each LPAR of FIG. 2 includes an application program (100) executing on computer hardware resources allocated to the LPAR. Each LPAR of FIG. 2 also includes a file system (204) and a file system API (202). The file system (204) of FIG. 2 is the overall structure in which objects such as files are named, stored, and organized from the perspective of application programs. The file system API (202) of FIG. 2 provides computer program functions for use by application programs in interfacing with the file system (204), including computer program functions that create a file, open a file, write to a file, read from a file, delete a file, and so on, as will occur to those of skill in the art. In providing such file-related functionality, the file system also tracks which LUNs and LBAs on storage devices compose a file.

In the example of FIG. 2, LPAR (105) includes an instance of a low-level, switched fabric I/O library (108) that includes an API (206). Such an I/O library (108) organizes Fibre Channel data storage resources (308) and presents such resources through API (206) to a file system (204) in the form of virtual disk drives. Each instance of a switched fabric I/O library (108) in this example is a module of computer program instructions composed of I/O operations that perform low-level I/O operations between an LPAR (105) and a remote storage device (308). Low-level I/O operations are I/O operations at the level of logical unit numbers ('LUNs') and logical block addresses ('LBAs') of disk space on storage devices. Computer program instructions that perform low-level I/O operations between an LPAR (105) and a remote storage device (308) are invoked through the I/O library API (206). The low-level I/O operations invoked through the I/O library API (206) can be implemented as, for example, a SCSI command contained in a Command Descriptor Block (CDB), or in any other ways that will occur to one of skill in the art.

In the example of FIG. 2, each LPAR (105) includes a queue pair (406). Each queue pair (406) includes a send queue and receive queue for data communications between an LPAR (105) and a data storage device (308). The queue pair (406) of FIG. 2 stores work queue elements ('WQEs') (414) that represent a data communications instruction. In the example of FIG. 2, the WQE (414) can include a request ID, information that specifies a region of memory in an LPAR for I/O operations, Fibre Channel specific information, such as, for example, the address of the storage device targeted by the data communications instruction, or any other information useful in facilitating data communications between an LPAR and a storage device as will occur to those of skill in the art.

In the example of FIG. 2, the LPAR includes an I/O memory region (208). The I/O memory region (208) is a segment of memory, within the memory space of the LPAR (105), that is accessible by the HFCA (114) for I/O operations between the LPAR (105) and a data storage device (308). The HFCA (114) can, for example, write data to the I/O memory region (208) as part of a read request issued by the LPAR (105) to a storage device (308). The HFCA (114) can also read data from the I/O memory region (208) as part of a write request issued by the LPAR (105) to a storage device (308).

The example of FIG. 2 includes an HFCA (114). The HFCA (114) is a physical adapter, a module of computer hardware and software improved to carry out data communications according to embodiments of the present invention, that implements Fibre Channel communications between computer (152 on FIG. 1) and a storage device (308) through a Fibre Channel fabric (103 on FIG. 1), with Fibre Channel port names implemented with World Wide Names or 'WWNs,' node ports or 'N-Ports' implemented with Fibre Channel network addresses, and so on, all in accordance with the Fibre Channel standards. The HFCA (114) in the example of FIG. 2 includes three logical Fibre Channel adapters ('IFCAs') (116), a separate LFCA for each of the three LPARs (105) in this example. The host Fibre Channel adapter or 'HFCA' (114) in this example is a 'host' Fibre Channel adapter in the sense that it is a Fibre Channel adapter improved according to embodiments of the present invention to be capable of hosting multiple LFCAs.

The example of FIG. 2 includes multiple LFCAs (116) which are 'logical' adapters in the sense that each LFCA is in fact a 'virtual' adapter. That is, an LFCA (116) is not an HFCA, nor is it a physical Fibre Channel adapter of any kind Instead, an LFCA is a set of structures and procedures that enable an HFCA to operate as though it were multiple physical adapters with a separate physical Fibre Channel adapter dedicated to the use of any LPAR. An LFCA presents to an LPAR the appearance and function of a separate whole Fibre Channel adapter, so that multiple LPARs appear to operate multiple Fibre Channel adapters, despite the fact only one HFCA is installed in the computer. An LPAR uses an LFCA in the same manner as the LPAR would use a dedicated, physical Fibre Channel adapter. The LFCA is exposed to the LPAR through exactly the same interface or API as would be a dedicated, separate Fibre Channel adapter, so that the LPAR cannot distinguish between a dedicated, physical Fibre Channel adapter and an LFCA.

In the example of FIG. 2, each LFCA (116) includes a map (212). The map (212) of FIG. 2 is a data structure that includes data storage for an LFCA identifier (118) and a range of I/O memory addresses in the address space of an LPAR. The range of I/O memory addresses can define a memory region in which a queue pair is to be operated in the address space of an LPAR. The range of I/O memory addresses also can define an I/O memory region, separate from any queue pair, in the address space of an LPAR, where the memory region is used for data transfer of data stored outside any queue pair or any WQE. The map associates an LFCA with an LPAR by storing memory addresses that are located in the memory of the LPAR, the only LPAR, that is associated with a particular LFCA. In the mapping, there is no need for a separate identifier for the LPAR, because only one LPAR has memory addresses specified in the map.

In the example computer of FIG. 2, the I/O libraries (108) in the LPARs (105) and the hypervisor (136) work together to establish LFCAs (116) and to transfer data between the RAM of the LPARs and data storage devices (308). The I/O libraries (108) and the hypervisor (136), working together, establish in the HFCA (114) separate LFCAs (116) for at least two of the logical partitions, where, as mentioned above, each LFCA is composed of an association of an LFCA identifier (118) with at least one range of I/O memory addresses (120) in the address space of a logical partition. In this example, the range of I/O memory addresses specifies I/O queues (104) in each LPAR. Each LPAR contains an instance of an I/O library that in turn includes I/O functions (110) that call LFCA support functions in the hypervisor through API (134) to establish an LFCA. The API calls are identical to the API calls that an I/O library would make to initialize a driver for an actual Fibre Channel adapter, so that the fact that the calls establish an LFCA is actually transparent to the LPARs and their I/O libraries. The I/O memory addresses (120) in each LFCA (116) effectively map each LFCA to a separate one of the LPARs (105).

The I/O libraries and the hypervisor work together to establish LFCAs and to transfer data in the sense that the hypervisor provides support functions (210) for the creation of LFCAs and for data transfer, support functions that are called by member methods in the I/O libraries. The support functions (210) in the hypervisor are exposed to the I/O libraries as support functions for a Fibre Channel adapter, so that from the perspective of the member methods or routines in the I/O libraries, each I/O library in an LPAR that wants one has its own separate Fibre Channel adapter. The I/O library call to create an LFCA appears to the I/O library as a call to initialize its own separate Fibre Channel adapter, as in, for example:

hyp_FCA_driver_init(i/o_memory_addresses), an example of a call to a hypervisor's support function to initialize a driver for a Fibre Channel adapter that the hypervisor treats as an instruction to establish (214) an LFCA for the LPAR of the calling library. The example of FIG. 2 includes two forms of LFCA, one in which LFCAs (116) are represented as object-oriented instances of an LFCA class and another in which LFCA are represented as entries in a table (224) each record of which represents an LFCA by associating an LFCA identifier ('LFCA ID') with at least one range of I/O memory addresses in the address space of a logical partition—represented in this example table (224) by a send queue address and a receive queue address, in effect, addresses for a queue pair in the memory space of an LPAR. I/O support queues in the memory space of the LPARs can include not only queue pairs for normal data communications but also queue pairs for asynchronous events as well as completion queues. Each queue pair typically includes a send queue and a receive queue.

When application programs (100) in the LPARs (105) eventually request I/O to or from a remote data storage device, the data processing system of FIG. 2 transfers data between the LPARs and the data storage devices through the LFCAs (116), the HFCA (114), and the Fibre Channel fabric (103). The I/O libraries (108) and the hypervisor through its LFCA support functions again cooperate to effect data transfers. To write or read data to or from a storage device, an I/O library enqueues a send work queue entry (WQE) into a send queue of a queue pair and then calls a hypervisor LFCA support function to notify the HFCA (114) through the hypervisor call of data ready to be transferred. Another option here is to dedicated a separate 'doorbell' hardware register to each queue pair and allow the I/O library to write directly to such a hardware register for a given queue pair to indicate the presence of new WQEs. For embodiments capable of supporting such additional hardware registers, this more hardware-oriented alternative can provide a performance benefit. The hypervisor maintains an association between each LFCA and each LPAR that has an LFCA, that is, for example, in a table each record of which includes an identifier for an LPAR and that LPAR's LFCA. From the perspective of the calling library, such a call appears as a notification to a Fibre Channel adapter that a WQE has been enqueued. The called routine within the hypervisor identifies the LFCA of the LPAR of the calling library and writes the identifier of that LFCA into a notification queue (218). The entries (219) in the notification queue represent notifications to the HFCA controller (220) of enqueued WQEs.

The HFCA controller (220) is a module of electronic controls for the HFCA (114). The controller (220) may be implemented as a microprocessor with a control program in flash memory or RAM, as a field programmable gate array ('FPGA'), as a complex programmable logic device ('CPLD'), as an application-specific integrated circuit ('ASIC'), as an embedded microcontroller with a Harvard architecture, as a custom-designed network of synchronous and asynchronous logic, and in other ways as may occur to those of skill in the art. The controller (220) administers the notifications (219) in the notification queue (218) in a round robin manner (216). That is, rather than processing in turn, in the order received, for example, each and every notification (219) in the notification queue (218), the controller (220) processes a next notification from a next LFCA. If the next LFCA ID in the notification queue (218) is the same as the immediately previous LFCA ID, then processing that notification next risks an I/O bottleneck centered on that LFCA. Moving down round robin through the notification queue (218) until the controller finds a (220) next, different LFCA ID eliminates the risk of an I/O bottleneck on an LFCA of an LPAR that happens to be more active than other LFCAs of other LPARs. When the controller determines which LFCA ID entry to process, the controller looks up the pertinent memory address or addresses for the LPAR's queue pair (406) or I/O memory region (208) from a map (212) in an LFCA object (116), from a table such as table (224), or from some other association of an LFCA and its I/O memory addresses as may occur to those of skill in the art.

The HFCA in this example includes a Fibre Channel port (222). The Fibre Channel port (222) is composed of the conductive pathways and connections required by the Fibre Channel standard to connect the HFCA to a Fibre Channel switch (122) and therefore to a Fibre Channel fabric (103) generally. The controller (220) opens data exchange sessions for WQEs generally through port (222) and switch (122) through the fabric (103) with data storage devices (308) and transfers data to and from storage devices through such open data exchange sessions. Such open data exchange sessions organize data transfers according to the Fibre Channel standard. The Fibre Channel standard, however, does not contemplate or provide for LFCAs or multiple LFCAs supporting multiple data transfers to and from multiple LPARs. Data transferred through the port, the switch, and the fabric accords with the Fibre Channel standard. Data transfers between the HFCA and the LPARs are improved according to embodiments of the present invention to support multiple LPARs. The controller associates data transfers on the fabric side of the controller with a data transfer to or from a particular LPAR by associating an identifier for that LPAR's LFCA with an identifier for a particular Fibre Channel data exchange session between the HFCA and a storage device. Such an association between an LPAR's LFCA and a particular Fibre Channel data exchange session can be maintained, for example, by the controller (220) in the HFCA (114) in a data structure such as illustrated in Table 1:

TABLE 1

| LFCA | FC Exchange ID |
|------|----------------|
| 3213 | 0003 |
| 1234 | 0004 |
| 3456 | 0005 |
| 7876 | 0006 |

Each record in Table 1 associates an LPAR's LFCA with an identifier for a particular Fibre Channel data exchange session. Readers will recognize therefore that each row of Table 1 effectively identifies a logical or virtual Fibre Channel exchange session between an LPAR and a data storage device, a logical exchange session in which controller (220) effectively moderates between a standard exchange session on the fabric side of the controller (220) and the logical exchange session on the LFCA side of the controller (220). The table form of this structure is optional. Such an association of LFCAs and exchange session identifiers can be maintained in an array, in C-style structures, in linked lists, and in other forms of data structure as will occur to those of skill in the art.

In this example, the HFCA controller (220) transfers data between LPARs (105) and storage devices (308) at user privilege level on behalf of application programs (100) running in LPARs, including transmitting the data by the HFCA controller (220) directly to or from the RAM of an LPAR, buffering no additional copy of the transferred data in the HFCA. The transmissions of data directly to and from LPAR RAM (102) at the specified I/O memory addresses (120) and the maintenance of the user privilege level means that the data processing system of FIG. 2 does not incur the costly processing overhead of an I/O interrupt for context switching to a more protected privilege level in carrying out such transfers.

Figure 3:
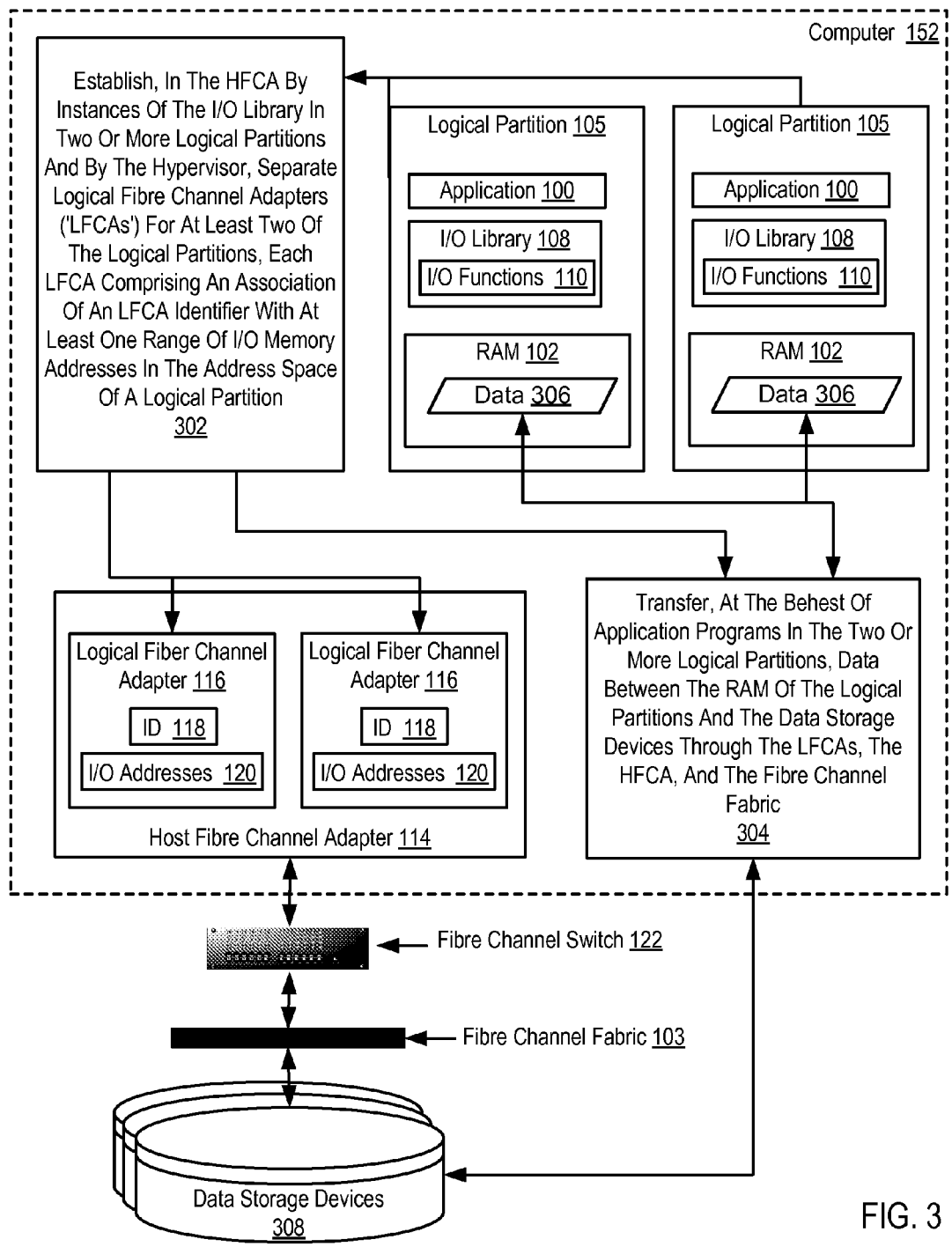

For further explanation, FIG. 3 sets forth a flow chart illustrating an exemplary method of data communications through an HFCA according to embodiments of the present invention. The method of FIG. 3 is implemented on a computer (152) such as, for example, the computer (152) described above with reference to FIG. 1. The computer (152) includes RAM (168 on FIG. 1) operatively coupled to at least one computer processor (156 on FIG. 1). The computer is coupled for data communications through an HFCA (114) and a Fibre Channel switch (122) of a Fibre Channel fabric (103) to one or more data storage devices (308). The computer in the example of FIG. 3 also includes two or more LPARs (105), the LPARs administered by a hypervisor (136 on FIG. 1). Each logical partition is assigned a portion (102) of the RAM of the computer, and each LPAR executes an application program (100). Each LPAR (105) also includes a separate instance of an operating system (106 on FIG. 1), where each instance of an operating system also includes an instance of a low-level, switched fabric input/output ('I/O') library (108).

The method of FIG. 3 includes establishing (302), in the HFCA (114) by instances of the I/O library (108) in two or more LPARs (105) and by the hypervisor (136 on FIG. 1), separate LFCAs for at least two of the LPARs. Establishing (302) an LFCA for each LPAR is carried out by calls to functions (110) in the I/O library (108). In the method of FIG. 3, calls to functions (110) in the I/O library (108) can be made dynamically, at run-time, by the hypervisor at the behest of an LPAR (105) attempting to perform data communications with a storage device (308). In the method of FIG. 3, calls to functions (110) in the I/O library (108) can alternatively be made by a hypervisor (136 on FIG. 1) as part of an initialization sequence performed by the hypervisor when the hypervisor creates an LPAR. Calls to functions in the I/O library are identical to the API calls that an I/O library would make to initialize a driver for an actual Fibre Channel adapter. The fact that the calls establish an LFCA is actually transparent to the LPARs and their I/O libraries. From the perspective of the member methods or routines in the I/O libraries, each I/O library in an LPAR that wants one has its own separate Fibre Channel adapter.

In the method of FIG. 3, establishing (302) an LFCA includes associating an LFCA identifier (118) with at least one range of I/O memory addresses (120) in the address space of an LPAR. The fact that the I/O memory addresses are in the range of address space of a particular LPAR associates a particular LPAR with a particular LFCA. The range of I/O memory addresses can define one or more queue pairs in the address space of an LPAR. The range of I/O memory addresses optionally also can define an I/O memory region, separate from any queue pair, in the address space of an LPAR, where the memory region is used for data transfer of data stored outside any queue pair or any WQE. Associating an LFCA identifier and a range of I/O memory addresses in the address space of an LPAR (105) can be carried out by calls to functions (110) in the I/O library (108). In the method of FIG. 3, calls to functions (110) in the I/O library (108) that associate an LFCA identifier and a range of I/O memory addresses can be made by a hypervisor (136 on FIG. 1) as part of an initialization sequence performed by the hypervisor when the hypervisor creates an LPAR. In the method of FIG. 3, calls to functions (110) in the I/O library (108) that associate an LFCA identifier and a range of I/O memory addresses can alternatively be made dynamically, at run-time, by an LPAR by an LPAR (105) attempting to perform data communications with a storage device (308).

The method of FIG. 3 also includes transferring (304), at the behest of application programs (100) in the two or more LPARs (105), data between the RAM (102) of the LPARs and the data storage devices through the LFCAs (116), the HFCA (114), and the Fibre Channel fabric (103). Transferring (304) data between RAM (102) of the LPARs and the data storage devices typically is implemented as a direct memory access transfer between the RAM (102) of the LPARs (105) and the data storage devices (308). In a direct memory access transfer between the RAM (102) of the LPARs (105) and the data storage devices, the HFCA (114) reads and writes data directly to and from the memory space for an LPAR. Because the HFCA (114) is capable of direct memory access transfers, the need to copy data between application memory and the data buffers in the operating system is eliminated. Such direct memory access transfers require no work to be done by CPUs and no caches in an HFCA as transfers continue in parallel with other system operations, with no interrupts for context switching to privileged processing.

Figure 4:
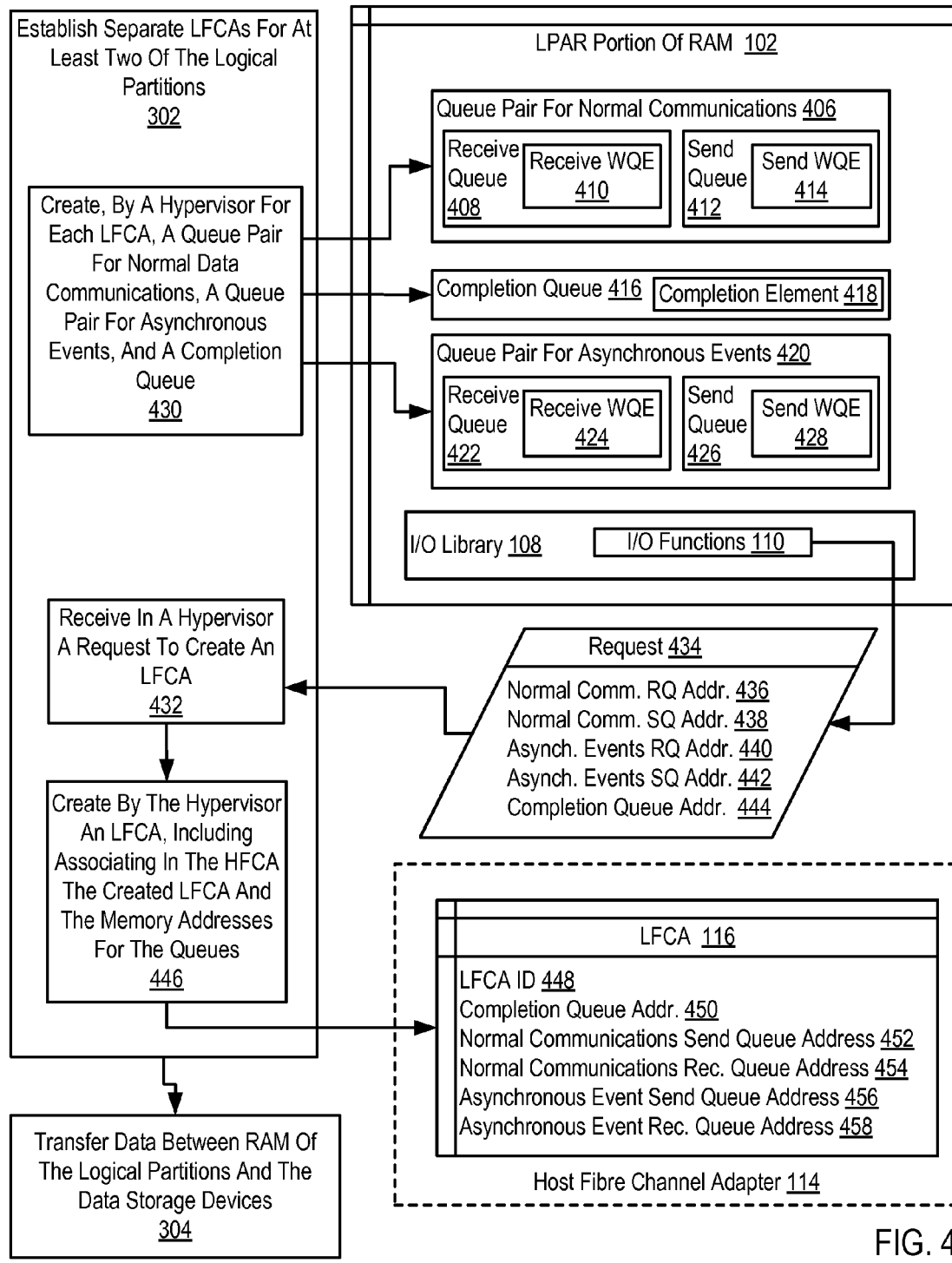
FIG. 4 sets forth a flow chart illustrating a further exemplary method for data communications through an HFCA according to embodiments of the present invention.

For further explanation, FIG. 4 sets forth a flow chart illustrating a further exemplary method for data communications through an HFCA according to embodiments of the present invention. The method of FIG. 4, like the method of FIG. 3, is implemented on a computer (152 on FIG. 1) such as, for example, the computer (152 on FIG. 1) described above with reference to FIG. 1. The computer (152 on FIG. 1) includes RAM (168 on FIG. 1) operatively coupled to at least one computer processor (156 on FIG. 1). The computer is coupled for data communications through an HFCA (114) and a Fibre Channel switch (122 on FIG. 1) of a Fibre Channel fabric (103 on FIG. 1) to one or more data storage devices (308 on FIG. 1). The computer in the example of FIG. 3 also includes two or more LPARs (105 on FIG. 1), the LPARs administered by a hypervisor (136 on FIG. 1). Each logical partition is assigned a portion (102) of the RAM of the computer, and each LPAR executes an application program (100 on FIG. 1). Each LPAR (105 on FIG. 1) also includes a separate instance of an operating system (106 on FIG. 1), where each instance of an operating system also includes an instance of a low-level, switched fabric input/output ('I/O') library (108).

The method of FIG. 4 is further similar to the method of FIG. 3 in that the method of FIG. 4 also includes establishing (302) separate LFCAs for at least two of the LPARs (105 on FIG. 1) and transferring (304) data between the RAM of the LPARs and the data storage devices. In the method of FIG. 4, however, establishing LFCAs also includes creating (430), by the hypervisor for each LFCA, a queue pair for normal data communications (406), a queue pair for asynchronous events (420), and a completion queue (416), each queue pair (406, 420) including a send queue (412, 426) and a receive queue (408, 422).

In the method of FIG. 4, the queue pair for normal data communications (406) includes a send queue (414) and a receive queue (410). A send queue (414) stores send WQEs (412), where each WQE represents a data communications instruction. Data communications instructions include all possible I/O operations that can be implemented between LPAR RAM and storage device connected through a Fibre Channel fabric, including send operations, receive operations, direct memory access operations, and so on. In the example of FIG. 2, a send WQE (412) can include an identifier for the WQE, a specification of a region of memory in an LPAR for I/O operations, Fibre Channel specific information, such as, for example, the address of the storage device targeted by the data communications instruction, as well as other information useful in facilitating data communications between an LPAR and a storage device as will occur to those of skill in the art. A receive work queue (408) stores receive WQEs (410), each of which provides storage space for storage device status, administrative information regarding data exchanges, and the like.

In the method of FIG. 4, the queue pair for asynchronous events (420) includes a send queue (426) and a receive queue (422). Asynchronous events are 'asynchronous' in that they are not part of the normal back and forth of normal data communications. Instead, an LFCA driver in an I/O library of an LPAR is immediately notified of the arrival in the HFCA of an asynchronous event targeted at that LFCA. Asynchronous events are Fibre Channel functions that provide a mechanism through which an HFCA can receive information concerning a Fibre Channel fabric accessible to the computer (152 on FIG. 1) through the HFCA. Information concerning the Fibre Channel fabric can include, for example, a notification that a new storage device has been added to the network, a notification that a storage device has been removed from the network, a notification that a storage device on the network is malfunctioning, and other information concerning the Fibre Channel fabric that will occur to those of skill in the art. In the method of FIG. 4, an I/O library function posts a receive WQE in a receive queue of an asynchronous queue pair. Upon receipt of an asynchronous event, the HFCA determines the target queue pair and places the asynchronous event in the memory location specified by the posted receive WQE in the receive queue of the target queue pair. To the extent that more than multiple LFCAs effectively use the same Fibre Channel fabric for data communications with storage devices, then the HFCA may broadcast a single asynchronous event pertinent to that fabric to more than one LPAR.

In the method of FIG. 4, the completion queue (416) is a mechanism for receiving completion elements (418), each of which represents an indication of completion of an I/O instruction from a WQE in a normal communications send queue. A completion queue is a mechanism through which functions of an I/O library that submit WQEs can learn of the completion of I/O instructions from the submitted WQEs. A function that enqueues a WQE can check the completion queue periodically to learn of the completion of the enqueued WQE by processing a completion element in the completion queue.

In the method of FIG. 4, establishing separate LFCAs for each of the two or more LPARs (105 on FIG. 1) also includes receiving (432), in a hypervisor (136 on FIG. 1) from the fabric-style I/O library (108), a request (434) to create the LFCA. In the method of FIG. 4, a request (434) to create the LFCA includes memory addresses (436, 438) in the RAM of the LPAR for a queue pair (406) for normal data communications. The library's request to create an LFCA appears from the perspective of the library as a request to initialize a Fibre Channel driver, such as, for example:

hyp_FCA_driver_init(i/o_memory_addresses).

An LPAR's I/O library knows nothing of LFCAs. The hypervisor, however, treats such a call as an instruction to establish (214) an LFCA for the LPAR of the calling library. The memory addresses in the RAM (102) of the LPAR (105 on FIG. 1) for a queue pair (406) for normal data communications specify for the hypervisor the location in the RAM (102) of the LPAR (105 on FIG. 1) where the queue pair for normal data communications (406) is located. The location of the queue pair for normal data communications (406) in the RAM (102) of the LPAR (105 on FIG. 1) can be determined, for example, when the LPAR (105 in FIG. 1) is first initialized by the hypervisor or later, dynamically at run time, for example, at the behest of a system administrator.

The method of FIG. 4 also includes, responsive to receiving the request to establish an LFCA, creating an LFCA, including associating (404), by the hypervisor in the HFCA (114), the created LFCA and the memory addresses for the send and receive queues. The hypervisor associates created LFCA and the memory addresses for the send and receive queues by storing in association in an appropriate data structure (116) in the HFCA an identifier (448) for the newly created LFCA and the memory addresses for the queue pair, a send queue address (452) for normal data communications and a receive queue address (454) for normal communications. Data structure that can be used to associate LFCA identifiers and queue pair addresses can be implemented, for example, as rows in a table, linked lists, data arrays, C-style structures, and so on.

In the method of FIG. 4, a request (434) to create the LFCA includes memory addresses (440, 442) in the RAM (102) of the LPAR (105 on FIG. 1) for a queue pair (420) for asynchronous events and a memory address (444) in the RAM of the LPAR for a completion queue (416). The library's request to create an LFCA appears from the perspective of the library as a request to initialize a Fibre Channel driver, such as, for example:

hyp_FCA_driver_init(i/o_memory_addresses).

An LPAR's I/O library knows nothing of LFCAs. The hypervisor, however, treats such a call as an instruction to establish (214) an LFCA for the LPAR of the calling library. The memory addresses in the RAM (102) of the LPAR (105 on FIG. 1) for a queue pair (420) for asynchronous events specify for the hypervisor the location in the RAM (102) of the LPAR (105 on FIG. 1) where the queue pair for asynchronous events (420) is located. The memory address in the RAM (102) of the LPAR (105 on FIG. 1) for a completion queue (416) for completion elements (418) specifies for the hypervisor the location in the RAM (102) of the LPAR (105 on FIG. 1) where the completion queue (416) is located. The location of the queue pair for asynchronous events (420) and the location of the completion queue (416) in the RAM (102) of the LPAR (105 on FIG. 1) can be determined, for example, when the LPAR (105 on FIG. 1) is first initialized by the hypervisor or later, dynamically at run time, for example, at the behest of a system administrator.

The method of FIG. 4 also includes, responsive to receiving the request to establish an LFCA, creating an LFCA, including associating (404), by the hypervisor (136) in the HFCA (144), the created LFCA and the memory addresses for the queues. The hypervisor associates the created LFCA and the memory addresses for the queues by storing in association in an appropriate data structure (116) in the HFCA an identifier (448) for the newly created LFCA and the memory addresses a completion queue address (450), a send queue address (456) for asynchronous events, and a receive queue address (458) for asynchronous events. Data structures that can be used to associate LFCA identifiers and queue pair addresses can be implemented, for example, as rows in a table, linked lists, data arrays, C-style structures, and so on.

Figure 5:
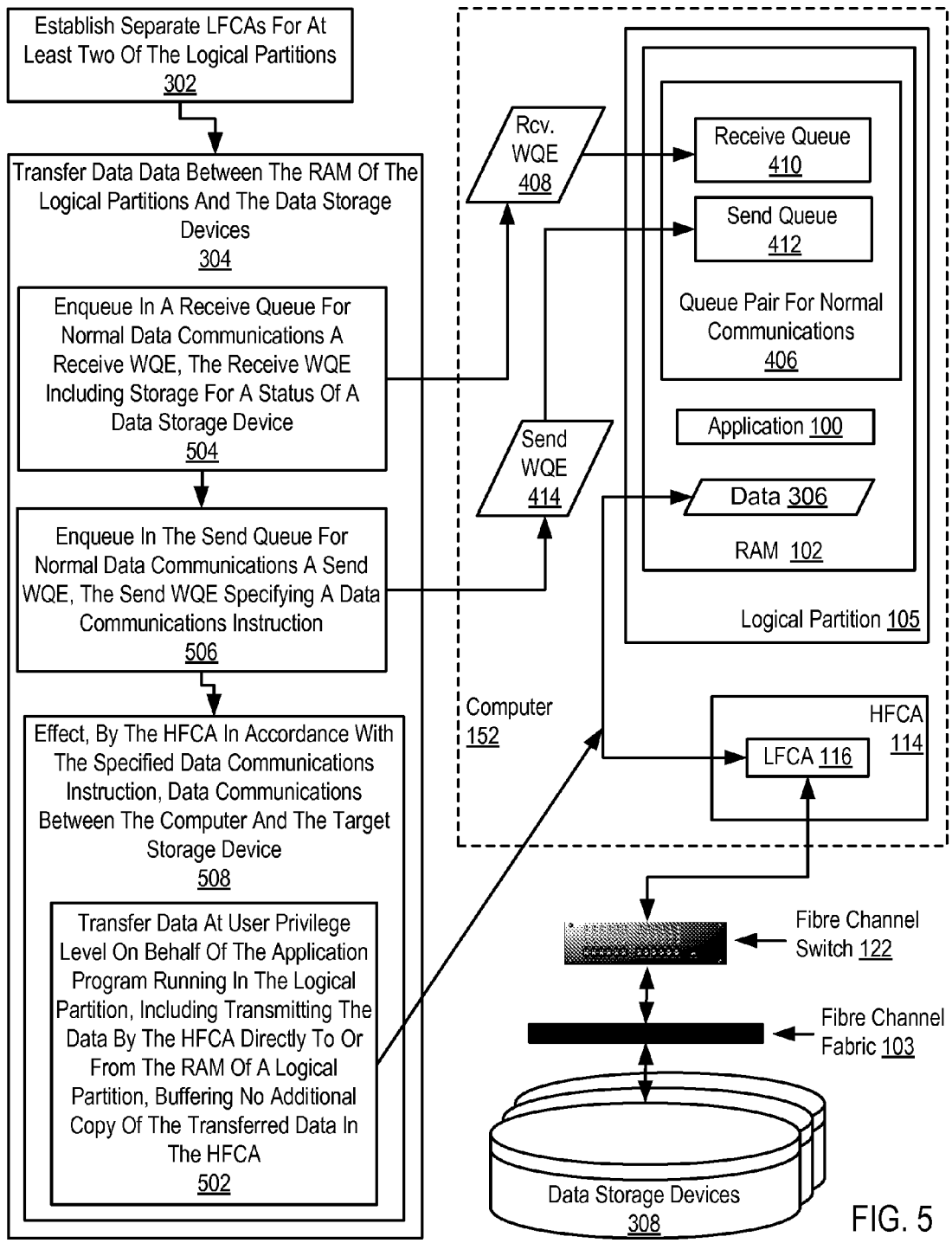
FIG. 5 sets forth a flow chart illustrating a further exemplary method for data communications through an HFCA according to embodiments of the present invention.

For further explanation, FIG. 5 sets forth a flow chart illustrating a further exemplary method for data communications through an HFCA according to embodiments of the present invention. The method of FIG. 5, like the method of FIG. 3, is implemented on a computer (152) such as, for example, the computer (152) described above with reference to FIG. 1. The computer (152) includes RAM (168 on FIG. 1) operatively coupled to at least one computer processor (156 on FIG. 1). The computer is coupled for data communications through an HFCA (114) and a Fibre Channel switch (122) of a Fibre Channel fabric (103) to one or more data storage devices (308). The computer in the example of FIG. 3 also includes two or more LPARs (105), the LPARs administered by a hypervisor (136 on FIG. 1). Each logical partition is assigned a portion (102) of the RAM of the computer, and each LPAR executes an application program (100). Each LPAR (105) also includes a separate instance of an operating system (106 on FIG. 1), where each instance of an operating system also includes an instance of a low-level, switched fabric input/output ('I/O') library (108).

The method of FIG. 5 is further similar to the method of FIG. 3 in that the method of FIG. 5 also includes establishing (302) separate LFCAs for each LPAR and transferring (304) data (306) stored in the RAM (102) of an LPAR (105). In the method of FIG. 5, however, transferring (304) data (306) stored in the RAM (102) of an LPAR (105) also includes enqueueing (504) in the receive queue (410) for normal data communications a receive WQE (408), the receive WQE (408) comprising storage for a status of a data storage device as well as other administrative information related to a particular I/O instruction. Status of a data storage device can be, for example, a SCSI status byte indicating that a target has successfully completed an I/O instruction, an indication of an error or abnormal condition in executing an I/O instruction, an indication that the target is presently busy, and so on.

In the method of FIG. 5, transferring data stored in the RAM (102) of an LPAR (105) also includes enqueueing (506) in the send queue (414) for normal data communications a send WQE (412), where the send WQE (412) specifies a data communications instruction. A data communications instruction may be implemented, for example, as an I/O instruction set forth in a SCSI Command Descriptor Block ('CDB') that includes of an operation code followed by instruction-specific parameters. In the method of FIG. 5, the send WQE can include a request ID that is used to identify the WQE. The send WQE of FIG. 5 also includes information that specifies a region of memory, in the memory space of an LPAR, where data is to be read from or written to in accordance with the data communications instruction. The send WQE of FIG. 5 also includes Fibre Channel specific information, such as, for example, the address of the storage device targeted by the data communications instruction.

In the method of FIG. 5, transferring (304) data stored in the RAM (102) of an LPAR (105) also includes effecting (508), by the HFCA in accordance with the specified data communications instruction, data communications between the computer and the target storage device (306). Effecting data communications, as the phrase is used in the present application, includes reading data from a remote storage device and writing data to a remote storage device. Such data communication in a SCSI context over Fibre Channel, for example, includes an HFCA acting as an initiator of a data exchange, designating a data storage device as the target of the exchange, and carrying out the actual exchange at the behest of the target, after which the target sends final device status and a completion message.

In the method of FIG. 5, transferring (304) data stored in the RAM (102) of an LPAR (105) includes transferring (502) data (306) at user privilege level on behalf of the application program (100) running in the LPAR (105), including transmitting the data (306) by the HFCA (114) directly to or from the RAM (102) of the LPAR (105). In the method of FIG. 5, transmitting the data by the HFCA directly from the RAM of an LPAR includes buffering no additional copy of the transferred data in the HFCA. In most computer systems, an application program operates at a user privilege level that denies direct access to I/O resources. Such an application program gains access to I/O resources by calls to I/O library functions that are installed as operating system components that operate at a higher level of privilege. Gaining access to the higher privilege in most systems requires a costly context switch of all the architectural registers of the processor on which the application and the operating system components execute. The transmissions of data directly to and from LPAR RAM (102), in computers that implement data communication through an HFCA according to embodiments of the present invention, at the specified I/O memory addresses (120) and the maintenance of the user privilege level means that the computer (152) does not incur the costly processing overhead of an I/O interrupt for context switching to a more protected privilege level in carrying out such transfers.

Exemplary embodiments of the present invention are described largely in the context of a fully functional computer system for data communication through an HFCA. Readers of skill in the art will recognize, however, that the present invention also may be embodied in a computer program product disposed on computer-readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of data communications through a host Fibre Channel adapter ('HFCA') of a computer, the computer comprising computer memory, the computer coupled for data communications through the HFCA to one or more data storage devices, the computer further comprising two or more logical partitions, the logical partitions administered by a hypervisor, each logical partition assigned a portion of the computer memory, each logical partition comprising a separate instance of a low-level, switched fabric input/output ('I/O') library, the method comprising:
  establishing, in the HFCA by instances of the I/O library in two or more logical partitions and by the hypervisor, separate logical Fibre Channel adapters ('LFCAs') for at least two of the logical partitions, each LFCA comprising at least one range of I/O memory addresses in the address space of the logical partition; and
  transferring data between the computer memory of the logical partitions and the data storage devices through the LFCAs and the HFCA.

2. The method of claim 1 wherein establishing LFCAs further comprises creating, by the hypervisor for each LFCA, a queue pair for normal data communications, a queue pair for asynchronous events, and a completion queue, each queue pair comprising a send queue and a receive queue.

3. The method of claim 1 wherein establishing LFCAs further comprises:
  receiving, in the hypervisor from the fabric-style I/O library a request to create an LFCA, the request including memory addresses in the computer memory of the logical partition of a send queue for normal data communications and a receive queue for normal data communications, the send queue and the receive queue comprising storage for work queue entries ('WQEs'), each WQE representing a data communications instruction; and
  responsive to receiving the request, creating by the hypervisor an LFCA, including associating in the HFCA the created LFCA and the memory addresses for the send and receive queues.

4. The method of claim 1 wherein establishing LFCAs further comprises:
  receiving, in the hypervisor from the fabric-style I/O library a request to create an LFCA, the request including memory addresses in the computer memory of the logical partition of a queue pair for normal data communications, memory addresses in the computer memory of the logical partition of a queue pair for asynchronous events, and memory addresses in the computer memory of the logical partition for a completion queue; and
  responsive to receiving the request, creating by the hypervisor an LFCA, including associating in the HFCA the created LFCA and the memory addresses for the queues.

5. The method of claim 1 wherein transferring data further comprises:
  enqueueing in a receive queue for normal data communications a receive WQE, the receive WQE comprising storage for a status of a data storage device;
  enqueueing in a send queue for normal data communications a send WQE, the send WQE specifying a data communications instruction; and
  effecting, by the HFCA in accordance with the specified data communications instruction, data communications between the computer and a target storage device.

6. The method of claim 1 wherein transferring data further comprises:
  transferring data at user privilege level on behalf of an application program running in the logical partition, including transmitting the data by the HFCA directly to or from the computer memory of a logical partition, buffering no additional copy of the transferred data in the HFCA.

7. A computer for data communications through a host Fibre Channel adapter ('HFCA'), the computer comprising computer memory, the computer coupled for data communications through the HFCA to one or more data storage devices, the computer further comprising two or more logical partitions, the logical partitions administered by a hypervisor, each logical partition assigned a portion of the computer memory each logical partition comprising a separate instance of a low-level, switched fabric input/output ('I/O') library, the computer memory having disposed within it computer program instructions capable of:
  establishing, in the HFCA by instances of the I/O library in two or more logical partitions and by the hypervisor, separate logical Fibre Channel adapters ('LFCAs') for at least two of the logical partitions, each LFCA comprising at least one range of I/O memory addresses in the address space of the logical partition; and
  transferring data between the computer memory of the logical partitions and the data storage devices through the LFCAs and the HFCA.

8. The computer of claim 7 wherein establishing LFCAs further comprises creating, by the hypervisor for each LFCA, a queue pair for normal data communications, a queue pair for asynchronous events, and a completion queue, each queue pair comprising a send queue and a receive queue.

9. The computer of claim 7 wherein establishing LFCAs further comprises:
  receiving, in the hypervisor from the fabric-style I/O library a request to create an LFCA, the request including memory addresses in the computer memory of the logical partition of a send queue for normal data communications and a receive queue for normal data communications, the send queue and the receive queue comprising storage for WQEs, each WQE representing a data communications instruction; and
  responsive to receiving the request, creating by the hypervisor an LFCA, including associating in the HFCA the created LFCA and the memory addresses for the send and receive queues.

10. The computer of claim 7 wherein establishing LFCAs further comprises:
  receiving, in the hypervisor from the fabric-style I/O library a request to create an LFCA, the request including memory addresses in the computer memory of the logical partition of a queue pair for normal data communications, memory addresses in the computer memory of the logical partition of a queue pair for asynchronous events, and memory addresses in the computer memory of the logical partition for a completion queue; and
  responsive to receiving the request, creating by the hypervisor an LFCA, including associating in the HFCA the created LFCA and the memory addresses for the queues.

11. The computer of claim 7 wherein transferring data further comprises:
  enqueueing in a receive queue for normal data communications a receive WQE, the receive WQE comprising storage for a status of a data storage device;
  enqueueing in a send queue for normal data communications a send WQE, the send WQE specifying a data communications instruction; and
  effecting, by the HFCA in accordance with the specified data communications instruction, data communications between the computer and a target storage device.

12. The computer of claim 7 wherein transferring data further comprises transferring data at user privilege level on behalf of an application program running in the logical partition, including transmitting the data by the HFCA directly to or from the computer memory of a logical partition, buffering no additional copy of the transferred data in the HFCA.

13. A computer program product for data communications through a host Fibre Channel adapter ('HFCA') of a computer, the computer program product disposed in a computer-readable, recordable medium, the computer program product comprising computer program instructions executable on a computer, the computer comprising computer memory, the computer coupled for data communications through the HFCA to one or more data storage devices, the computer further comprising two or more logical partitions, the logical partitions administered by a hypervisor, each logical partition assigned a portion of the computer memory of the computer, each logical partition comprising a separate instance of a low-level, switched fabric I/O library, the computer program instructions capable of:

establishing, in the HFCA by instances of the I/O library in two or more logical partitions and by the hypervisor, separate logical Fibre Channel adapters ('LFCAs') for at least two of the logical partitions, each LFCA comprising at least one range of I/O memory addresses in the address space of the logical partition; and transferring data between the computer memory of the logical partitions and the data storage devices through the LFCAs and the HFCA.

14. The computer program product of claim 13 wherein establishing LFCAs further comprises creating, by the hypervisor for each LFCA, a queue pair for normal data communications, a queue pair for asynchronous events, and a completion queue, each queue pair comprising a send queue and a receive queue.

15. The computer program product of claim 13 wherein establishing LFCAs further comprises:

receiving, in the hypervisor from the fabric-style I/O library a request to create an LFCA, the request including memory addresses in the computer memory of the logical partition of a send queue for normal data communications and a receive queue for normal data communications, the send queue and the receive queue comprising storage for WQEs, each WQE representing a data communications instruction; and responsive to receiving the request, creating by the hypervisor an LFCA, including associating in the HFCA the created LFCA and the memory addresses for the send and receive queues.

16. The computer program product of claim 13 wherein establishing LFCAs further comprises:

receiving, in the hypervisor from the fabric-style I/O library a request to create an LFCA, the request including memory addresses in the computer memory of the logical partition of a queue pair for normal data communications, memory addresses in the computer memory of the logical partition of a queue pair for asynchronous events, and memory addresses in the computer memory of the logical partition for a completion queue; and responsive to receiving the request, creating by the hypervisor an LFCA, including associating in the HFCA the created LFCA and the memory addresses for the queues.

17. The computer program product of claim 13 wherein transferring data further comprises:

enqueueing in a receive queue for normal data communications a receive WQE, the receive WQE comprising storage for a status of a data storage device;

enqueueing in a send queue for normal data communications a send WQE, the send WQE specifying a data communications instruction; and effecting, by the HFCA in accordance with the specified data communications instruction, data communications between the computer and a target storage device.

18. The computer program product of claim 13 wherein transferring data further comprises:

transferring data at user privilege level on behalf of an application program running in the logical partition, including transmitting the data by the HFCA directly to or from the computer memory of a logical partition, buffering no additional copy of the transferred data in the HFCA.

\* \* \* \* \*